United States Patent [19]
Medlin et al.

[11] 3,993,121
[45] Nov. 23, 1976

[54] HEAT PUMP CONVERSION SYSTEM FOR ELECTRIC FURNACE

[76] Inventors: Glenn D. Medlin, P.O. Box 608, Mount Pleasant, N.C. 28124; Glenn D. Medlin, Jr., P.O. Box 1012, Concord, N.C. 28025

[22] Filed: Dec. 29, 1975

[21] Appl. No.: 644,582

[52] U.S. Cl. .................................. 165/29; 62/160; 62/324
[51] Int. Cl.² ........................................ F25B 29/00
[58] Field of Search .................. 165/29; 62/160, 324

[56] References Cited
UNITED STATES PATENTS

| | | | |
|---|---|---|---|
| 2,806,674 | 9/1957 | Biehn | 165/29 |
| 3,004,399 | 10/1961 | Keller | 62/140 |
| 3,060,698 | 10/1962 | Felter | 62/160 |
| 3,111,009 | 11/1963 | Maudlin | 62/156 |
| 3,132,490 | 5/1964 | Schmidt | 62/155 |
| 3,365,902 | 1/1968 | Nussbaum | 62/155 |
| 3,777,508 | 12/1973 | Imabayashi et al. | 62/324 |
| 3,779,031 | 12/1973 | Akiyama et al. | 62/160 |

*Primary Examiner*—Edgar W. Geoghegan
*Attorney, Agent, or Firm*—Peck & Peck

[57] ABSTRACT

A heat pump conversion system includes an electric furnace located within a building and having a first coil heat exchanger therein, an outside heat exchanger unit having a refrigerant compressor, a second coil heat exchanger and pipe and valve means for selectively connecting the first and second coil heat exchangers and the compressor for reversing the cycle of the heat pump to provide cooling and heating, and a thermostat disposed in a space to be heated within the building having a cooling switch for operating the heat pump in a cooling mode of operation, a first stage heating switch to operate the heat pump in a heating mode of operation when the temperature in the space drops below a set temperature, and a second stage heating switch for operating electrical heating elements in the electric furnace when the temperature in the space drops to a predetermined level below the set temperature. A protection circuit prevents operation of the compressor if the refrigerant temperature in the outside heat exchanger unit fails to reach a prescribed level within a predetermined time period after the first stage heating switch has closed.

7 Claims, 2 Drawing Figures

HEAT PUMP CONVERSION SYSTEM FOR ELECTRIC FURNACE

BACKGROUND OF THE INVENTION

1. Field of the Invention

The present invention pertains to heat pump conversion systems and, more particularly, to heat pump conversion systems for use with electric furnaces.

2. Discussion of the Prior Art

Reverse cycle operation of heat pump cooling or air conditioning systems to produce heat for space heating or defrosting is known, as exemplified by U.S. Pat. Nos.

3,004,399 — Keller
3,060,698 — Felter
3,111,009 — Maudlin
3,132,490 — Schmidt
3,365,902 — Nussbaum
3,777,508 — Imabayashi, et al.
3,779,031 — Akiyama, et al.

Such heat pump reversing or conversion systems have not as yet met with full acceptance in that they merely offer a different manner of heating rather than fulfilling their potential as an additional heat source to be combined with a heat generating system of a different type. Furthermore, conventional heat pump conversion systems have not provided sufficient protection against adverse operating conditions thereby permitting such systems to undergo failures which could be avoided.

SUMMARY OF THE INVENTION

Accordingly, it is a primary object of the present invention to overcome the above-mentioned disadvantages of the prior art by providing a heat pump conversion system for use with an electric furnace while providing protection against adverse operating conditions.

Another primary object of the present invention is to combine a heat pump conversion system with an electric furnace to provide two stage heating such that the heat pump produces low capacity heat during a first stage of system operation and eletrical heating elements produce heat at full capacity during a second stage of operation.

An additional object of the present invention is to prevent operation of the compressor of a heat pump system if refrigerant temperature fails to reach a prescribed level within a predetermined time after a first stage heating switch is closed calling for heat.

The present invention has another object in that a conventional heating and cooling system for a building can be simply modified to produce two-stage heating with different sources of heat.

Some of the advantages of the present invention over the prior art are that the heat pump conversion system of the present invention can be implemented with existing equipment, both heat pump and electrical heating are utilized therefore providing backup should one or the other fail and eliminating the need for expensive emergency maintenance service, and the compressor will not operate under improper conditions while a lamp provides an indication of such conditions, for instance inefficient operation of the heat exchanger unit, failure of the outside heat exchanger to defrost, low refrigerant, faulty valve operation or compressor malfunction.

The present invention is generally characterized in a heat pump conversion system including a furnace located within a building to be heated including a heat exchanging chamber, electrical heating elements disposed in the chamber and a first coil heat exchanger disposed in the chamber and having first and second ports, an outside heat exchanger unit including a refrigerant compressor having an inlet and an outlet, a second coil heat exchanger having first and second ports, pipe means providing refrigerant communication between the first port of the first coil heat exchanger and the second port of the second coil heat exchanger, and pipe and valve means selectively providing refrigerant communication between the inlet and the outlet of the compressor, the second port of the first coil heat exchanger and the first port of the second coil heat exchanger, the valve means having a cooling state establishing communication between the outlet of the compressor and the first port of the second coil heat exchanger and between the inlet of the compressor and the second port of the first coil heat exchanger and a heating state establishing communication between the outlet of the compressor and the second port of the first coil heat exchanger and between the inlet of the compressor and the first port of the second coil heat exchanger, electrically operated control means for controlling operation of the valve means, control element means for controlling operation of the electrical heating elements, and a thermostat disposed in a space to be heated within the building including a first heating switch operable when the temperature within the space to be heated drops below a set temperature to operate the electrically operated control means to place the valve means in the heating state and a second heating switch operable when the temperature within the space to be heated drops to a predetermined level below the set temperature to operate the control element means and supply electricity to the electrical heating elements whereby heat is obtained from the first coil heat exchanger when the space temperature drops below the set temperature and heat is obtained from the electrical heating elements when the space temperature drops to the predetermined level below the set temperature.

Other objects and advantages of the present invention will become apparent from the following description of the preferred embodiment taken in conjunction with the accompanying drawings.

DESCRIPTION OF THE PREFERRED EMBODIMENT

Figure 1:
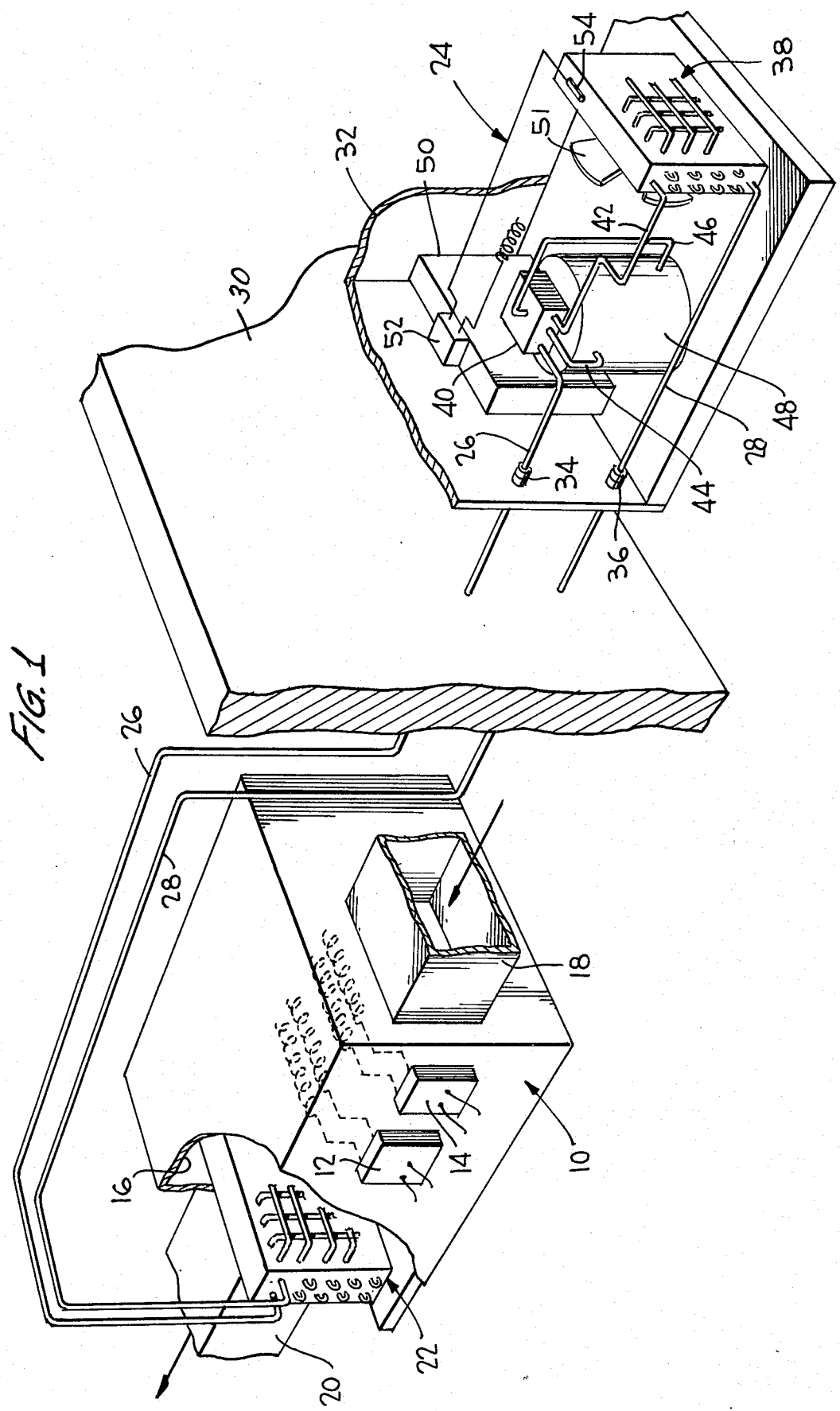
FIG. 1 is a diagrammatic illustration of the mechanical installation of the heat pump conversion system of the present invention.

The mechanical installation of a heat pump conversion system according to the present invention is shown in FIG. 1 and includes a furnace 10 having two sets of electrical heating elements 12 and 14 mounted in a heat exchanging chamber 16 which communicates with a return air duct 18 and a supply air duct 20. Also mounted in chamber 16 is a coil heat exchanger 22 which, during cooling of air conditioning operation, acts as an evaporator. The furnace is normally positioned within a building to be heated or cooled and is conventional in structure. Thus, the structure of the furnace is not shown in detail.

An outside heat exchanger unit 24 is disposed externally of the building, and pipes 26 and 28 extend through a wall 30 of the building between coil heat exchanger 22 and outside heat exchanger unit 24. The pipes 26 and 28 pass through a housing 32 for the heat exchanger unit via quick connect valves 34 and 36, respectively; and pipe 28 communicates with a coil heat exchanger 38 which, during cooling or air conditioning operation, acts as a condenser while pipe 26 communicates with a solenoid operated, four-way valve 40. Valve 40 operates to control flow between pipe 26 and a pipe 42 leading to heat exchanger 38 and pipes 44 and 46 from the inlet and outlet, respectively, of a compressor 48. Within the housing 32 is an electrical control box 50 containing circuitry for operating a fan 51 for heat exchanger 38, the valve 40 and the compressor 48, and a defrost control unit 52 is mounted on the electrical control box 50 and has a temperature sensor 54 disposed on heat exchanger 38.

The system as thus far described, with the exception of valve 40 and its concommitant pipes for reversing heat pump cycle operation, is conventional in heating and cooling systems where heat is provided by electrical heating elements in an electric furnace and cooling is provided by an evaporator of a heat pump. The coil heat exchangers 22 and 38 have conventional coil and fin structure such as in air conditioning systems where coil heat exchanger 22 acts as an evaporator and coil heat exchanger 38 acts as a condenser.

Figure 2:
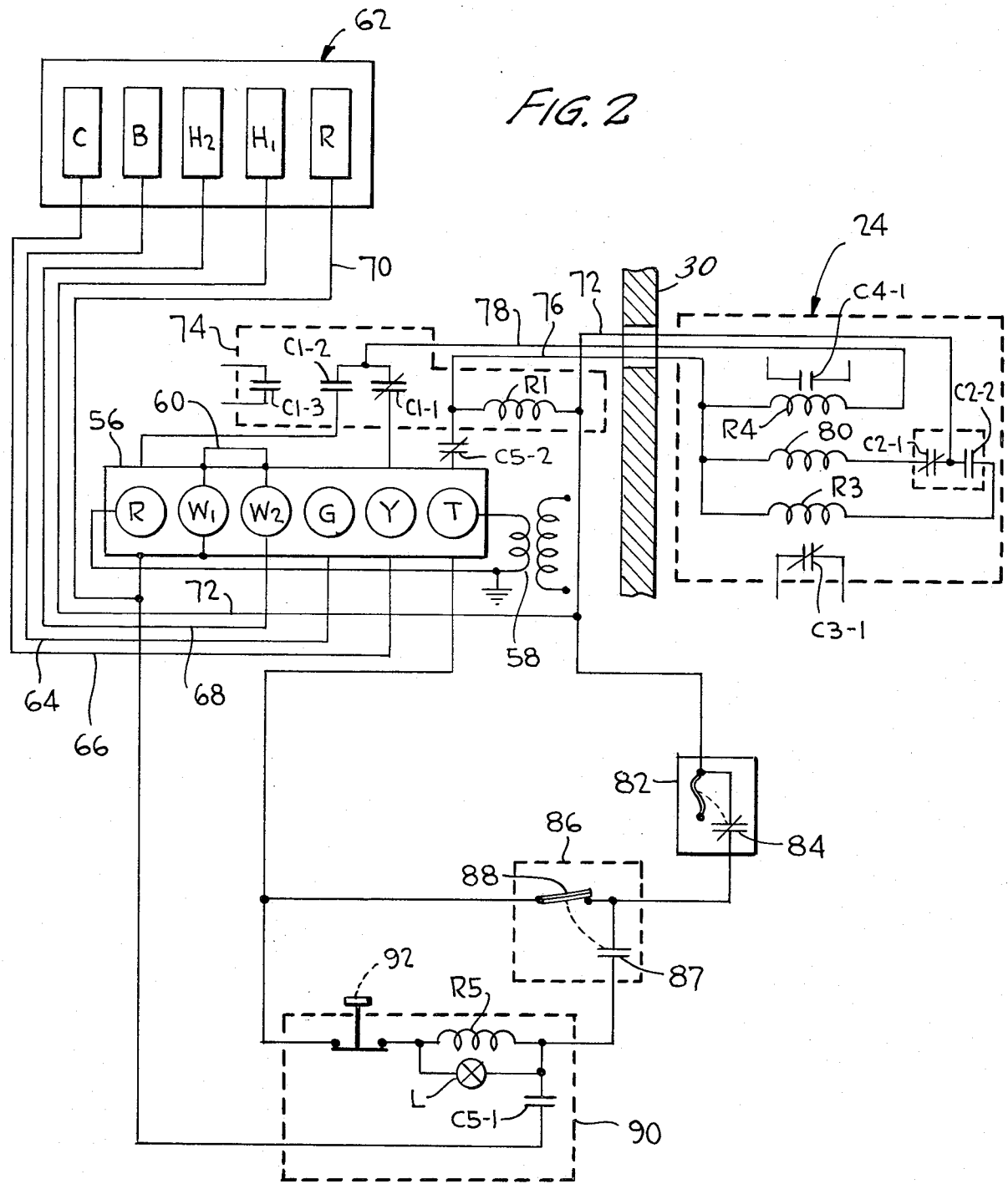
FIG. 2 is a wiring diagram for the heat pump conversion system of the present invention.

The electrical system for operating the mechanical installation is shown in the wiring diagram of FIG. 2 and includes a terminal strip 56 having terminals R and T receiving low voltage power via a stepdown transformer 58 adapted to be supplied with commercially available AC current, normally 110 volts, the terminal R constituting a common or reference terminal and the terminal T constituting a hot terminal. Control elements W1 and W2 are mounted on the terminal strip 56 and are adapted to control current supplied to the electrical heating elements 12 and 14, respectively, in furnace 10. In conventional heating systems, control element W1 would control operation of heating electrical element 12 and control element W2 would control operation of electrical element 14 such that the heating coils could be operated individually or together; however, in accordance with the present invention, a jumper wire 60 connects elements W1 and W2 such that these elements are operated together at all times. A control element G mounted on the terminal strip 56 controls the operation of a blower fan for the furnace 10, as is conventional, and a terminal Y on the strip 56 provides a connection for cooling operation of the outside heat exchanger unit 24. A thermostat 62 is disposed in a space to be temperature controlled within the building, the thermostat being of conventional two-stage structure and having a terminal R for receiving the common or reference voltage from the low voltage transformer 58, a normally manually operable switch B for controlling the furnace blower fan, a switch C for controlling cooling operation of the system, and switches H1 and H2 providing two-stage heating control. The switches B, C and H2 are connected to terminals at terminal strip 56 via leads 64, 66 and 68, respectively, while a lead 70 connects the terminal strip common R with the common terminal R at the thermostat and a lead 72 connects switch H1 with a relay 74.

Relay 74 includes a coil R1 connected between lead 72 and a lead 76 connected with the hot terminal T of the terminal strip 56 through normally closed contacts C5-2. The coil R1 controls normally closed contacts C1-1 connected with terminal Y, normally open contacts C1-2 connected with the common terminal R and contacts C1-1, and normally open contacts C1-3 adapted to be connected in a system, not shown, for providing optional duct heating. A lead 78 is connected in the junction of contact C1-1 and C1-2, and leads 72, 76 and 78 pass through the wall 30 of the building to the outside heat exchanger unit 24. Lead 72 is connected to lead 76 through normally closed contacts C2-1 in series with a solenoid 80 operable to control the four-way control valve 40 and in a parallel path through normally open contacts C2-2 in series with a relay coil R3 controlling normally closed contacts C3-1 which are operable to control the motor driving fan 51. Connected between leads 78 and 76 is a relay coil R4 for operating normally open contacts C4-1 controlling operation of the compressor 48.

A protection circuit includes a refrigerant temperature control 82 of the strap-on bulb type positioned to sense refrigerant temperature, such as on pipe 26, and controlling normally closed contacts 84 connected to lead 72. A bimetal time delay unit 86 is connected between terminal T and contacts 84 and includes a pair of normally open contacts 87 operable by a bimetal 88 to close after a predetermined period of time, the contacts 87 being connected to terminal T of the terminal strip 56 via a reset circuit 90. The reset circuit 90 includes a pushbutton switch 92 and a relay coil R5 operating normally open holding contacts C5-1 connected between the coil and the common terminal R of the terminal strip and the normally closed contacts C5-2 connected between terminal T of the terminal strip and lead 76 to provide circuit interruption control of the outside heat exchanger unit 24. A lamp L is connected across relay coil R5 and is preferably positioned at the thermostat to provide an indication that the system is not operating properly.

In operation, the thermostat 62 is positioned within a space in the building to be heated or cooled. The structure of the thermostat is conventional with the blower switch B being operable manually and along with the cooling and heating switches to force air flow through the furnace 10. When the system is in a cooling mode of operation, the heating switches H1 and H2 will be disabled and the cooling switch C will be operative to complete a circuit from the common R through switch Y, contact C1-1, relay coil R4 and contacts C5-2 to terminal T such that contacts C4-1 will be closed to operate the compressor. Since heating switch H1 is disabled when the thermostat 62 is in the cooling mode, solenoid 80 will be deenergized and the valve 40 will be placed in a cooling state establishing refrigerant communication from the outlet 46 of the compressor through pipe 42 to a first port of coil heat exchanger 38 while a second port of heat exchanger 22 will communicate with the inlet of the compressor via pipes 26 and 44. In this manner, when the temperature in the space rises above a set temperature, the cooling switch Y will be closed to operate the compressor 48 and circulate refrigerant through the system in a conventional manner with coil heat exchanger 38 acting as a condenser and coil heat exchanger 22 acting as an evaporator. Thus, air forced through the furnace 10 will be cooled at the evaporator to cool the space within the building.

When the thermostat is placed in a heating mode, heating switch H1 will be closed when the temperature in the space drops below the set temperature thereby completing a circuit to supply electricity through normally closed contacts C2-1 and solenoid 80 to change valve 40 to the heating state and further to supply electricity through relay coil R1 to energize the relay 74 to operate the compressor 48 through contacts C1-2. With the valve 40 in the heating state, the second port of coil heat exchanger 22 communicates with the outlet of compressor 48 via pipes 26 and 46 while the first port of coil heat exchanger 38 supplies refrigerant to the inlet of the compressor via pipes 42 and 44. In this manner, it can be seen that the operation of the heat pump has been reversed such that coil heat exchanger 38 is acting as an evaporator while coil heat exchanger 22 acts as a condenser to heat air forced through the furnace 10.

If the temperature in the space drops to a predetermined level, for instance two degrees, below the set temperature, heating switch H2 will be enabled to operate control element W1 and W2 thereby energizing electrical heating elements 12 and 14 to further heat air forced through the furnace. Accordingly, it will be appreciated that, when the first stage heating switch H1 is closed, the furnace will be operated at low heating capacity via the reverse cycle heat pump and, when the second stage heating switch H2 is closed, the furnace will be operating at full heating capacity including the heat obtained from the electrical heating elements and from the conversion of the heat pump.

The defrost control unit 52 includes a relay, not shown, operable in response to temperature sensed by sensor 54 to open contacts C2-1 and close contacts C2-2 when the coil heat exchanger 38 requires defrosting. When the defrost control relay is energized, closure of contacts C2-2 will energize relay coil R3 to deenergize the fan 51, and solenoid 80 will be deenergized to cause valve 40 to revert to its cooling state whereby heat is generated at coil heat exchanger 38, acting as a condenser, to defrost the coil heat exchanger. Once the coil heat exchanger has been sufficiently defrosted, the defrost control unit will return contacts C2-1 and C2-2 to permit the system to return to low capacity heating if heating switch H1 is calling for heat.

The protection circuit provides an indication of improper operation of the system in that when first stage heating switch H1 is closed, time delay 86 will be energized through normally closed contacts 84. If the refrigerant temperature control contacts 84 fail to open for any reason within the time required for closure of the time delay contacts 87, the coil relay R5 will be energized to close holding contacts C5-1 and open contacts C5-2 thereby disconnecting terminal T from lead 76 and discontinuing operation of the outside heat exchanger unit 24. The lamp L will be energized at this time and will remain lit until the system is manually reset by depressing switch 92 which will deenergize coil relay R3. Accordingly, the lamp L will provide an indication of inefficient operation of the outside heat exchanger unit, failure of the coil heat exchanger 38 to defrost, the system being low in refrigerant, failure of the valve 40 or compressor malfunction as well as any number of mechanical or electrical failures in the outside heat exchanger unit.

The thermostat can, of course, have any desired differential and anticipation characteristics for the heating switches, it being primarily important only that the furnace is converted to two-stage heating operation with low capacity heating provided by the reversed heat pump cycle and full capacity heating provided by the electrical heating elements. If either the electrical heating system or the heat pump heating system should fail, the other system will take over such that emergency service for the system is not required.

Inasmuch as the present invention is subject to many variations, modifications and changes in detail, it is intended that all subject matter discussed above or shown in the accompanying drawings be interpreted as illustrative and not in a limiting sense.

What is claimed is:

1. A heat pump conversion system comprising
furnace means located within a building to be heated including a heat exchanging chamber, electrical heating means disposed in said chamber and first coil heat exchanger means disposed in said chamber and having first and second ports;
an outside heat exchanger unit including refrigerant compressor means having an inlet and an outlet, second coil heat exchanger means having first and second ports, pipe means providing refrigerant communication between said first port of said first coil heat exchanger means and said second port of said second coil heat exchanger means, and pipe and valve means selectively providing refrigerant communication between said inlet and said outlet of said compressor means, said second port of said first coil heat exchanger means and said first port of said second coil heat exchanger means, said valve means having a cooling state establishing communication between said outlet of said compressor means and said first port of said second coil heat exchanger means and between said inlet of said compressor means and said second port of said first coil heat exchanger means and a heating state establishing communication between said outlet of said compressor means and said second port of said first coil heat exchanger means and between said inlet of said compressor means and said first port of said second coil heat exchanger means;
electrically operated control means for controlling operation of said valve means;
control element means for controlling operation of said electrical heating means; and
thermostat means disposed in a space to be heated within the building including first heating switch means operable when the temperature within the space to be heated drops below a set temperature to operate said electrically operated control means to place said valve means in said heating state and second heating switch means operable when the temperature within the space to be heated drops to a predetermined level below the set temperature to operate said control element means and supply electricity to said electrical heating means whereby heat is obtained from said first coil heat exchanger means when the space temperature drops below the set temperature and heat is obtained from said electrical heating means when the space temperature drops to said predetermined level below the set temperature.

2. A heat pump conversion system as recited in claim 1 and further comprising a source of electrical power, control means for operating said compressor, and protection circuit means including circuit interrupting means connecting said source with said compressor control means, temperature sensitive switch means positioned to sense temperature of the refrigerant and connected with said first heating switch means, time delay means connected in series with said temperature sensitive switch means and said source, and reset means responsive to said time delay means to control said circuit interrupting means, said time delay means being operative a predetermined time after said first heating switch means is enabled to operate said reset means unless said temperature sensitive switch means has opened in response to the refrigerant reaching a prescribed temperature, operation of said reset means opening said circuit interrupting means to prevent operation of said compressor means.

3. A heat pump conversion system as recited in claim 2 wherein said thermostat means includes cooling switch means for operating said compressor control means with said valve means in said cooling state.

4. A heat pump conversion system as recited in claim 3 and further comprising defrost control means responsive to the temperature at said second coil heat exchanger means to change said valve means from said heating state to said cooling state.

5. A heat pump conversion system as recited in claim 4 and further comprising relay means operated in response to enabling of said first heating switch means to disable operation of said compressor control means by said cooling switch means.

6. A heat pump conversion system as recited in claim 2 wherein said reset means includes manually operated switch means for closing said circuit interrupting means.

7. A heat pump conversion system as recited in claim 6 wherein said protection circuit means includes lamp means providing an indication when said circuit interrupting means is open.

* * * * *